US011663039B2

(12) United States Patent
Tzortzatos et al.

(10) Patent No.: US 11,663,039 B2
(45) Date of Patent: May 30, 2023

(54) WORKLOAD MANAGEMENT USING REINFORCEMENT LEARNING

(71) Applicant: International Business Machines Corporation, Armonk, NY (US)

(72) Inventors: Elpida Tzortzatos, Lagrangeville, NY (US); Anastasiia Didkovska, Schönaich (DE); Karin Genther, Hildrizhausen (DE); Toni Pohl, Filderstadt (DE); Dieter Wellerdiek, Ammerbuch (DE); Marco Selig, Böblingen (DE); Tobias Huschle, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 16/841,774

(22) Filed: Apr. 7, 2020

(65) Prior Publication Data
US 2021/0311786 A1 Oct. 7, 2021

(51) Int. Cl.
*G06N 20/00* (2019.01)
*G06F 18/21* (2023.01)
*G06F 9/50* (2006.01)

(52) U.S. Cl.
CPC ............ *G06F 9/5005* (2013.01); *G06F 9/505* (2013.01); *G06F 9/5011* (2013.01); *G06F 18/217* (2023.01); *G06N 20/00* (2019.01); *G06F 2209/5019* (2013.01)

(58) Field of Classification Search
None
See application file for complete search history.

(56) References Cited

U.S. PATENT DOCUMENTS

| | | | |
|---|---|---|---|
| 9,875,141 B2 | 1/2018 | Hellerstein et al. | |
| 9,923,785 B1* | 3/2018 | Li | H04L 41/40 |
| 10,146,286 B2 | 12/2018 | Lee et al. | |
| 10,374,791 B2 | 8/2019 | Teper et al. | |
| 10,489,215 B1* | 11/2019 | Wen | G06F 9/50 |
| 2006/0188011 A1* | 8/2006 | Goldszmidt | G06Q 10/04 |
| | | | 375/229 |
| 2008/0262890 A1* | 10/2008 | Korupolu | G06F 11/0793 |
| | | | 705/7.22 |
| 2008/0262991 A1 | 10/2008 | Kapoor et al. | |
| 2009/0099985 A1* | 4/2009 | Tesauro | G06N 5/02 |
| | | | 706/12 |

(Continued)

OTHER PUBLICATIONS

Marcus et al., "Workload management for cloud databases via machine teaming," 2016 IEEE 32nd International Conference on Data Engineering Workshops (ICDEW), Helsinki, 2016, 4 pages.

*Primary Examiner* — Lonnie V Sweet
(74) *Attorney, Agent, or Firm* — Cantor Colburn LLP; Teddi Maranzano

(57) ABSTRACT

Aspects of the invention include determining, by a machine learning model, a predicted workload for a system and a current system state of the system, determining an action to be enacted for the system based at least in part on the predicted workload and the current system state, enacting the action for the system, evaluating a state of the system after the action has been enacted, determining a reward for the machine learning model based at least in part on the state of the system after the action has been enacted, and updating the machine learning model based on the reward.

14 Claims, 6 Drawing Sheets

(56) References Cited

U.S. PATENT DOCUMENTS

| | | | |
|---|---|---|---|
| 2015/0024367 A1* | 1/2015 | Singh | G06N 20/00 |
| | | | 434/362 |
| 2017/0193558 A1* | 7/2017 | Lyons | G06F 18/28 |
| 2018/0034920 A1* | 2/2018 | Gopalan | G06N 3/006 |
| 2018/0121766 A1 | 5/2018 | McCord et al. | |
| 2018/0276050 A1* | 9/2018 | Gong | G06F 9/5083 |
| 2018/0351816 A1* | 12/2018 | Li | H04L 67/10 |
| 2019/0094941 A1 | 3/2019 | Sadasivam et al. | |
| 2019/0230046 A1 | 7/2019 | Djukic et al. | |
| 2019/0310636 A1* | 10/2019 | Halder | G05D 1/0274 |
| 2019/0324799 A1* | 10/2019 | Metsch | G06F 9/4881 |
| 2019/0324822 A1 | 10/2019 | Gottin et al. | |
| 2019/0370146 A1* | 12/2019 | Babu | G06F 11/3089 |
| 2019/0378098 A1* | 12/2019 | Lam | G06Q 20/027 |
| 2020/0234145 A1* | 7/2020 | Dai | G06F 18/2413 |
| 2020/0241921 A1* | 7/2020 | Calmon | G06N 3/0454 |
| 2020/0321084 A1* | 10/2020 | Bucur | G16H 10/40 |
| 2021/0004735 A1* | 1/2021 | Chalupka | G06Q 10/063 |
| 2021/0117240 A1* | 4/2021 | Creed | G06F 9/5011 |
| 2021/0146241 A1* | 5/2021 | Bleasdale-Shepherd | |
| | | | G06N 20/00 |
| 2021/0241090 A1* | 8/2021 | Chen | G06N 3/045 |
| 2021/0311786 A1* | 10/2021 | Tzortzatos | G06F 9/5005 |
| 2022/0156639 A1* | 5/2022 | da Silva | G06F 9/5011 |

\* cited by examiner

WORKLOAD MANAGEMENT USING REINFORCEMENT LEARNING

BACKGROUND

The present invention generally relates to computer servers, and more specifically, to workload management using reinforcement learning.

Operating systems provide controls to share finite hardware resources amongst client services. A workload includes one or more jobs performing computing for similar client services. When multiple workloads are executing in parallel on the same operating system, a component (e.g. workload manager (WLM)) provides controls to define attributes for each workload such as an importance level and a goal (e.g. response time). At regular intervals (e.g. every 10 seconds), this component assesses the results of each workload and may change the scheduler priority attribute of each workload so that the highest priority workloads achieve their goals. Work represents the aggregate computing performed across all workloads.

An operating system instructs a computer about how to process a workload. Whenever workload runtime execution characteristics change, a program or the workload itself has changed. Program changes can include client application changes to improve services or update purchased software products. When no programs have changed, arrival pattern changes affect workload interactions and cause runtime execution characteristics to change.

Analysts have limited technology to detect changes in workload runtime execution characteristics. Data is either too general for too long of an interval to detect transient changes or it is too detailed to summarize with low cost. As a result, workload runtime execution characteristics are analyzed reactively when a problem occurs. Even with better data, an analyst must manually compare runtime execution characteristics.

SUMMARY

Embodiments of the present invention are directed to a method for executing workload management decisions. A non-limiting example computer-implemented method includes determining, by a machine learning model, a predicted workload for a system and a current system state of the system, determining an action to be enacted for the system based at least in part on the predicted workload and the current system state, enacting the action for the system, evaluating a state of the system after the action has been enacted, determining a reward for the machine learning model based at least in part on the state of the system after the action has been enacted, and updating the machine learning model based on the reward.

Embodiments of the present invention are directed to a system for executing workload management decisions. A non-limiting example system includes a processor configured to determining, by a machine learning model, a predicted workload for a system and a current system state of the system, determining an action to be enacted for the system based at least in part on the predicted workload and the current system state, enacting the action for the system, evaluating a state of the system after the action has been enacted, determining a reward for the machine learning model based at least in part on the state of the system after the action has been enacted, and updating the machine learning model based on the reward.

Embodiments of the present invention are directed to a computer program product for executing workload management decisions, the computer program product including a computer readable storage medium having program instructions embodied therewith. The program instructions are executable by a processor to cause the processor to perform a method. A non-limiting example of the method includes determining, by a machine learning model, a predicted workload for a system and a current system state of the system, determining an action to be enacted for the system based at least in part on the predicted workload and the current system state, enacting the action for the system, evaluating a state of the system after the action has been enacted, determining a reward for the machine learning model based at least in part on the state of the system after the action has been enacted, and updating the machine learning model based on the reward.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
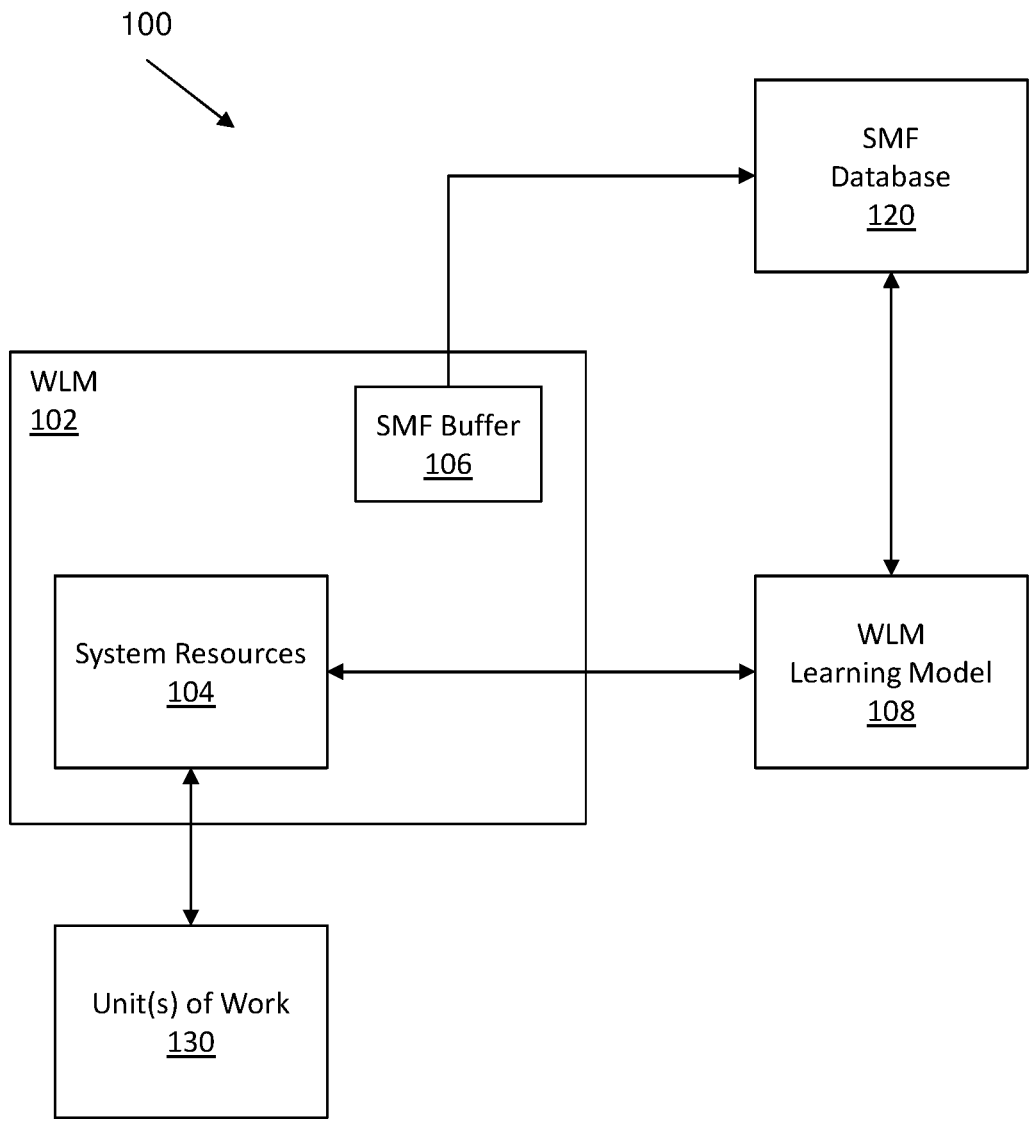
FIG. 1 depicts a block diagram of system having a workload manager (WLM) with a proactive learning agent in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provides for augmentation of a workload manager (WLM) with a proactive learning model. A WLM is a software component that manages system resources of a computer system that are to be made available to each executing work item based on performance criteria that define, implicitly or explicitly, relative priorities between competing work items. Performance criteria can be, for example, user defined goals. In other words, WLM adjusts system resources to incoming units of work based on goal definitions which reflect workload demands and user expectations. These units of work, typically, include batch jobs, transactions, and database queries. The WLM monitors and regulates the available resources that can be utilized by these units of work. The available resources include memory utilization, central processing unit (CPU) utilization, and disk input/output (I/O) bandwidth. During workload management, units of work that are managed by an operating system are organized into distinct classes (referred to as service classes). In other words, each work unit is associated with a service class, for example, online transaction, high priority batch, low priority batch, etc. For each service class, a certain amount of system resources is provided based on pre-defined goals for prioritization.

A WLM typically operates in a reactive manner. That is to say, the WLM regularly evaluates the achievement of performance goals for each services class and, after the fact, enacts one or more measures based on this after the fact evaluation. Further, the WLM can extrapolate workload utilization on a minute scale, but cannot predict expected workloads on a larger scale such as, for example, hours and days to exploit reoccurring patterns of usage. For example, a WLM that is operating mainframe computing systems for a stock exchange does not anticipate the opening of the market where the number of transactions would dramatically increase (i.e., the composition of workloads in the mainframe system changes drastically and so a WLM would need to overhaul the resource assignments entirely.) In the above example, WLMs tend to react poorly because large amounts of individual actions are taken to achieve performance goals. However, since market openings appear on a regular, repeated basis, a need exists for a WLM to anticipate and proactively target appropriate resource assignments.

One or more embodiments of the present invention address the above described short comings by providing workload management that anticipates and proactively targets appropriate resource assignments utilizing a proactive learning model. In one or more embodiments of the present invention, the proactive learning model is a reinforcement learning model. Reinforcement learning is a machine learning technique that learns from trial and error by getting a reward from interacting with an environment(s). Typically, the goal in reinforcement learning is to find a balance between exploration (of uncharted territory) and exploitation (of current knowledge). In reinforcement learning, an agent (e.g., a program) interacts with the system environment. After taking an action a, the system environment provides a description of its current state s (e.g., a vector covering selected system parameters) and a reward r is provided. The reward r can be a quantification of state changes occurring as a result of the action a (e.g., the evaluation of a system performance metric.) The agent can then utilize a, s, and r to update its state-action values (i.e., a function $Q(s, a)$ that estimates the reward obtained by taking action a on state s). The agent then decides on a next action a' by either choosing a exploratory random action or a greedy action according to $Q(s, a)$ that optimizes the expected reward. Depending on the implementation, the reward can be optimized on a short-term or a long-term scale. Then, the environment provides state s' and reward r' and the next cycle starts.

Turning now to FIG. 1, a block diagram of system 100 having a WLM with a proactive learning agent is generally shown in accordance with one or more embodiments of the present invention. The system 100 includes a WLM 102 having system resources 104 available to one or more unit(s)/item(s) of work 130. In one or more embodiments of the present invention, the system resources 104 are any physical or virtual component of limited availability within a computer system that can include, for example, memory access or memory addresses, central processing unit (CPU) access availability, disk input/output (I/O) bandwidth, and the like. The WLM 102 also includes an SMF buffer 106. SMF refers to a system management facility (SMF) which is a component of a mainframe computing system and provides a standardized method for writing out records of activity to a file (or a data set). The SMF provides full instrumentation of all baseline activities running on a mainframe operating system including, but not limited to, I/O activity, network activity, software usage, error conditions, processor utilization, and the like. The SMF buffer 106 stores data associated with the baseline activities of a mainframe and then transfers this SMF data to the SMF database 120. The SMF database 120 can store historical SMF data for the WLM 102 and mainframe system utilizing the WLM 102.

In one or more embodiments of the present invention, the system 100 includes a WLM learning model 108 that is utilized for predicting upcoming workloads for the WLM 102. The WLM learning model 108 can be utilized in place of a system resource manager (SRM). Traditional WLMs utilize a system resource manager (SRM). An SRM determines which address spaces, of all active address spaces, should be given access to system resources and the rate at which each address space is allowed to consume these resources. The WLM learning model 108 can be trained utilizing historical SMF data from the SMF database 120. The type of machine learning technique for the WLM learning model 108 can be reinforcement learning. As mentioned above, reinforcement learning is a machine learning technique that learns from trial and error by getting a reward from interacting with an environment(s). The goal in reinforcement learning is to find a balance between exploration (of uncharted territory) and exploitation (of current knowledge). The historic SMF data can be partitioned into individual data points/chunks of data/snapshots of {historic state, taken action, gained reward}. Generally speaking, the reward metric is a priority weighted sum of performance improvements of individual services classes, such that performance gains on service classes with higher priority result in a higher reward. This can be choosing specific weights such as, for example, SUM_i Priority_i*delta-of-PerformanceIndex_i for all service classes i. In some embodiments of the invention, the reward model could also be a separately designed, trained, and deployed machine learning model. That is to say, how to compute the reward can be externalized as a user specific issue that every user might want to define/solve. In that case, the reward is calculated based on the state of the system responsive to an action taken in the historical SMF data. Exploration is usually done to a fixed percentage (e.g., 10% of the time (or every 10th step) an action is taken at random). Exploitation is done by selecting an action that is beneficial in terms of reward which is often referred to as "greedy". A greedy strategy would be to take the action that is promising the most reward according to the trained model. Another strategy would be to evaluate a serial of actions, accumulate the rewards, and select the path the promises the most reward in the end. This latter strategy includes a whole tree structure of possible actions and to which algorithms can utilized to implement such strategies.

In one or more embodiments of the present invention, the WLM learning model 108 can be initially trained utilizing the historical SMF data. After training, the WLM learning model 108, can be implemented in a WLM 102 to predict and estimate upcoming workloads and, utilizing a reward model, can determine the state of the system mainframe to determine how well the WLM 102 is performing. The WLM learning model 108 can be updated based on the rewards that are calculated from the state of the system when an action has been taken.

Figure 2:
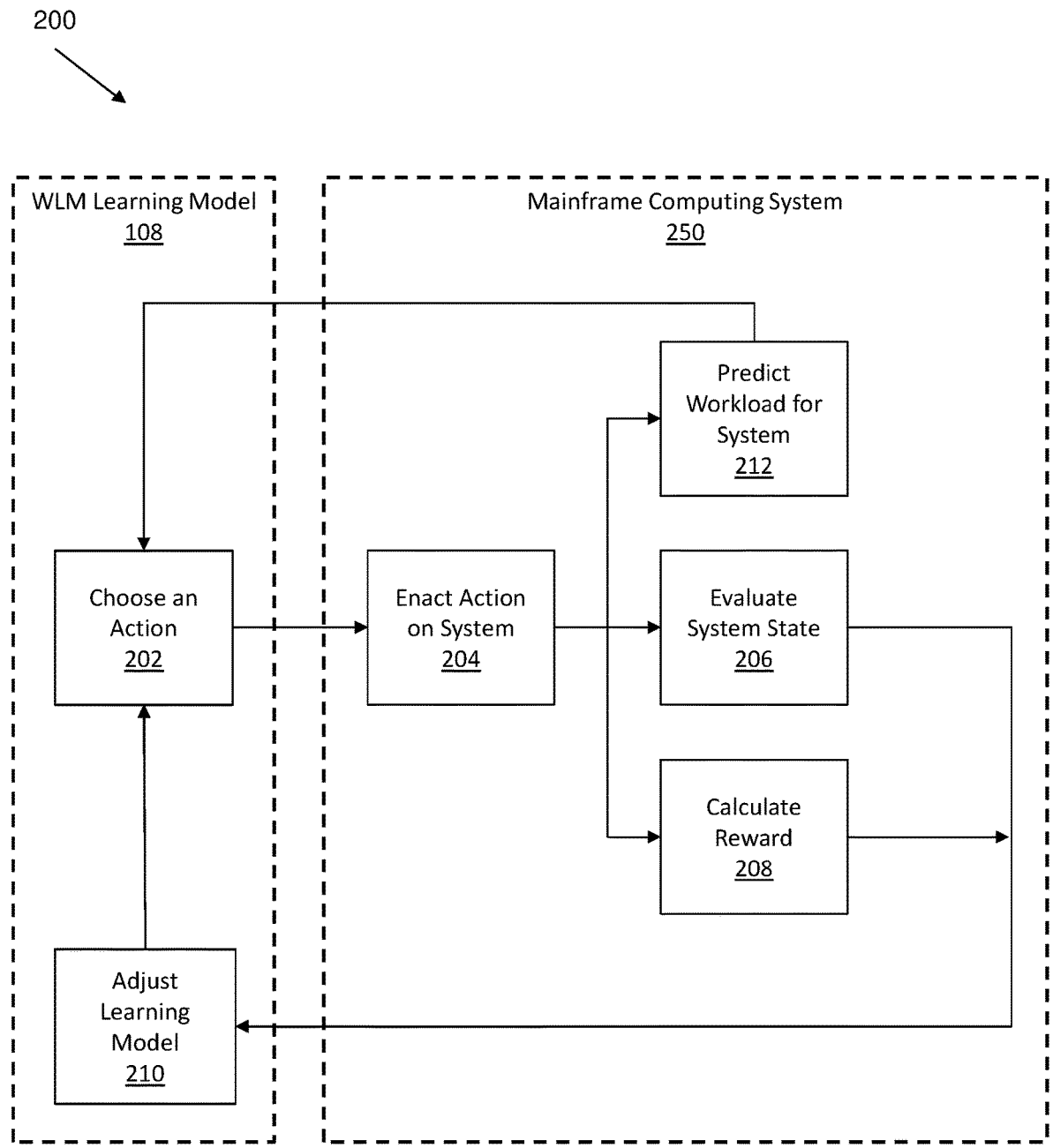
FIG. 2 depicts a flow diagram of a method for workload management utilizing a WLM learning model according to one or more embodiments of the present invention.

FIG. 2 depicts a flow diagram of a method 200 for workload management utilizing a WLM learning model according to one or more embodiments of the present invention. At least a portion of the method 200 can be executed, for example, by the system 100 and the WLM learning model 108 shown in FIG. 1. In one or more embodiments of the present invention, the WLM learning model 108 can choose an action to be taken on the system 100 by the WLM 102, as shown in block 202. The action chosen can be based on a predicted workload for the system 212. The predicted workload can be determined by the WLM learning model 108 based on historical SMF data. Once the action is chosen by the WLM learning model, the method 200 includes enacting the action on the system as shown in block 204. The action can be enacted by the WLM 102 (from FIG. 1) on the mainframe computing system 250. After the action is enacted, the state of the system can be evaluated, as shown in block 206. Based on the state of the system, a reward can be calculated, as shown in block 208. The reward can be optimized on a short-term or a long-term scale provided by the state of the system environment. The method 200 included adjusting the learning model based on the system state and the reward, as shown in block 210. The WLM learning model could be updated after each reward is calculated; however, in some embodiments, the model can be updated after some time interval (e.g., nightly) to ensure that the model has actually changed. (Every step will change the model, but typically only in the sub-permill range.) More specifically, as the system is complex, one might encounter the same (or very similar) state, take the same action, but receive a different reward. Therefore, it is crucial to update the model. In one or more embodiments of the present invention, the method 200 can be repeated based on predicted workloads for the system 250 based on the WLM learning model 108. The reward that is calculated and provided to update the WLM learning model 108 can be based on the customer goals for utilizing the computing system 250, for example. A customer may decide to operate the mainframe computer system 250 to operate in a lowest cost mode (low cost workload execution) that still meets a certain operational minimum. For example, a low cost mode could limit the number of users that are allowed to access the mainframe computing system 250. A customer may also decide to operate the mainframe computer system 250 for the highest level of performance (high throughput workload execution). This could allow any number of users to access the computing system 250. The calculated reward 208 can be determined based on these customer goals where the evaluated state of the system 206 can be evaluated against these goals. The reward would be indicative on whether the predicted workload 212 and the action 204 resulted in a system state that reflects these customer defined goals. The goals could also be set by a system administrator or could be a default set with each system such as, for example, a balance between cost and performance. A standard reinforcement learning approach uses the current system state to evaluate the reward for an action, this is improved by expanding the state to {current+predicted system state}. To be more concrete, the state might include an incoming amount of workload (for services classes . . . ) of a past interval of time and is enriched by a prediction for a future interval. This way a recognized pattern like the soon to happen market opening is included in the state and can be reacted upon proactively. In some embodiments of the invention, the predictor can be a machine learning model by itself.

Additional processes may also be included. It should be understood that the processes depicted in FIG. 2 represent illustrations, and that other processes may be added or existing processes may be removed, modified, or rearranged without departing from the scope and spirit of the present invention.

Figure 3:
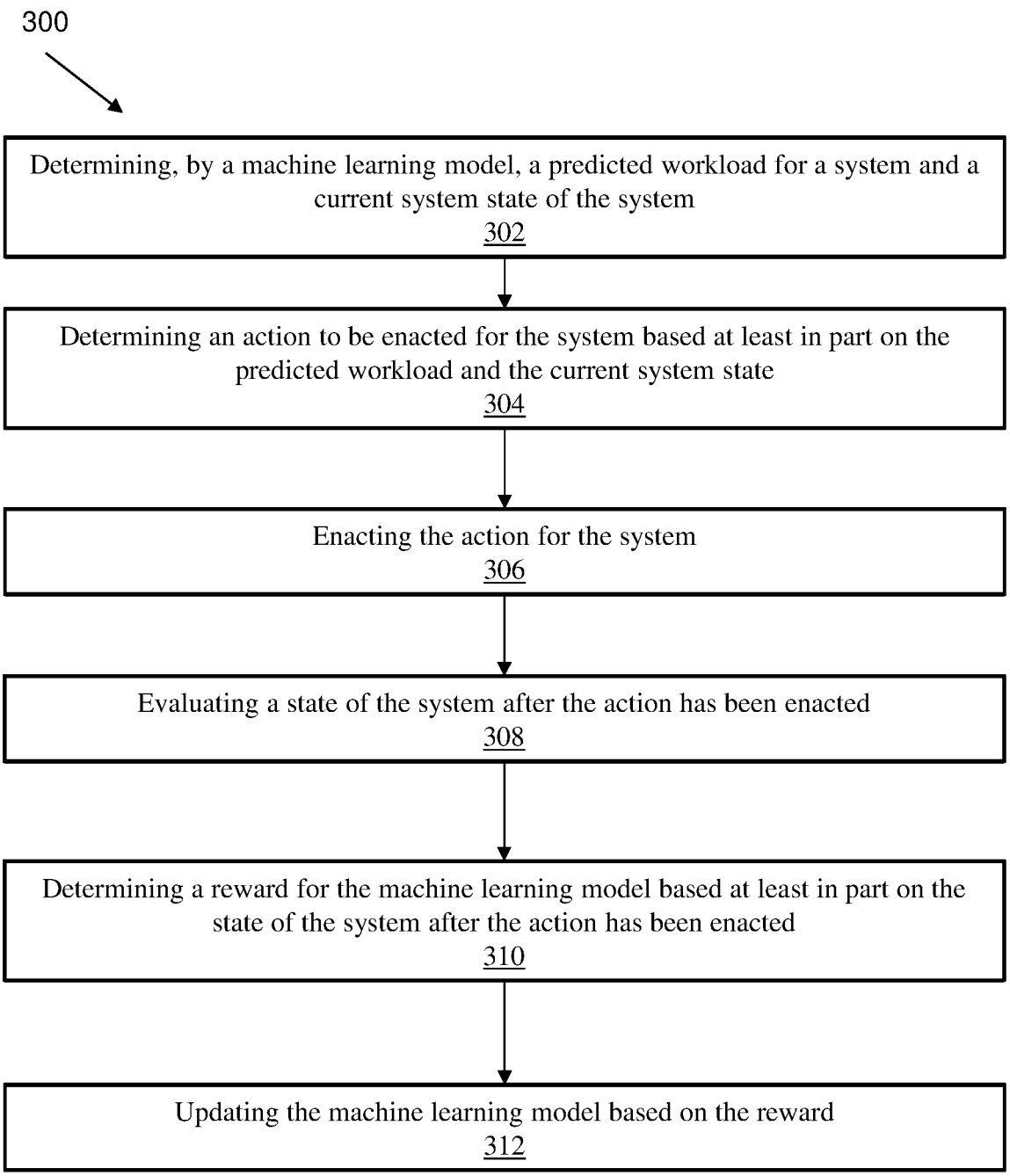
FIG. 3 depicts a flow diagram of a method for workload management according to one or more embodiments of the present invention.

FIG. 3 depicts a flow diagram of a method for workload management according to one or more embodiments of the invention. At least a portion of the method 300 can be executed, for example, by the WLM 102 shown in FIG. 1. The method 300 includes determining, by a machine learning model, a predicted workload for a system and a current system state, as shown in block 302. The predicted workload for the system can be determined by the WLM learning model based on historical SMF data that is utilized to anticipate workloads that may have longer windows for repetition such as, for example, stock market openings, daily or weekly recurrent events, and the like. At block 304, the method 300 continues by determining an action to be enacted for the system based at least in part on the predicted workload and the current system state. The action can be an exploratory action, or an exploitative action based on historical data. As explained above, a fixed rate of choice can be exploratory while the other fraction is exploitive, and for the latter a long-/short-term greedy strategy may apply; e.g., 10% change for exploration should be sufficient for a pre-trained model. In one or more embodiments of the invention, a one-set-classification could be performed on the input to infer whether the input at hand is in an already well charted area of the phase space or not and adapt; e.g., be more explorative in unknown regions and more exploiting in known ones. After the action has been determined, the method 300 includes enacting the action for the system, as shown in block 306. Enacting the action includes the system allocating system resources for users or workloads that are accessing the system. In some embodiments of the present invention, the system can be a mainframe computing system that provides access to various users. The method 300 then includes evaluating a state of the system after the action has been enacted, as shown at block 308. The state of the system includes how the system is operating compared to a customer defined goal for the system (e.g., low cost, high power, etc.). The state of the system is utilized at block 310 where the method 300 includes determining a reward for the machine learning model based at least in part on the state of the system after the action has been enacted. The reward is calculated based on the expected state of the system versus the evaluated state of the system. When the action is taken based on the predicted workload, the WLM is expecting to see a certain state. If the state is as expected, the reward will reflect this. The same is true if the state is unexpected, the reward reflects this unexpected state and the WLM learning model can be updated as shown in block 312, where the method 300 includes updating the machine learning model based on the reward.

Additional processes may also be included. It should be understood that the processes depicted in FIG. 3 represent illustrations, and that other processes may be added or existing processes may be removed, modified, or rearranged without departing from the scope and spirit of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
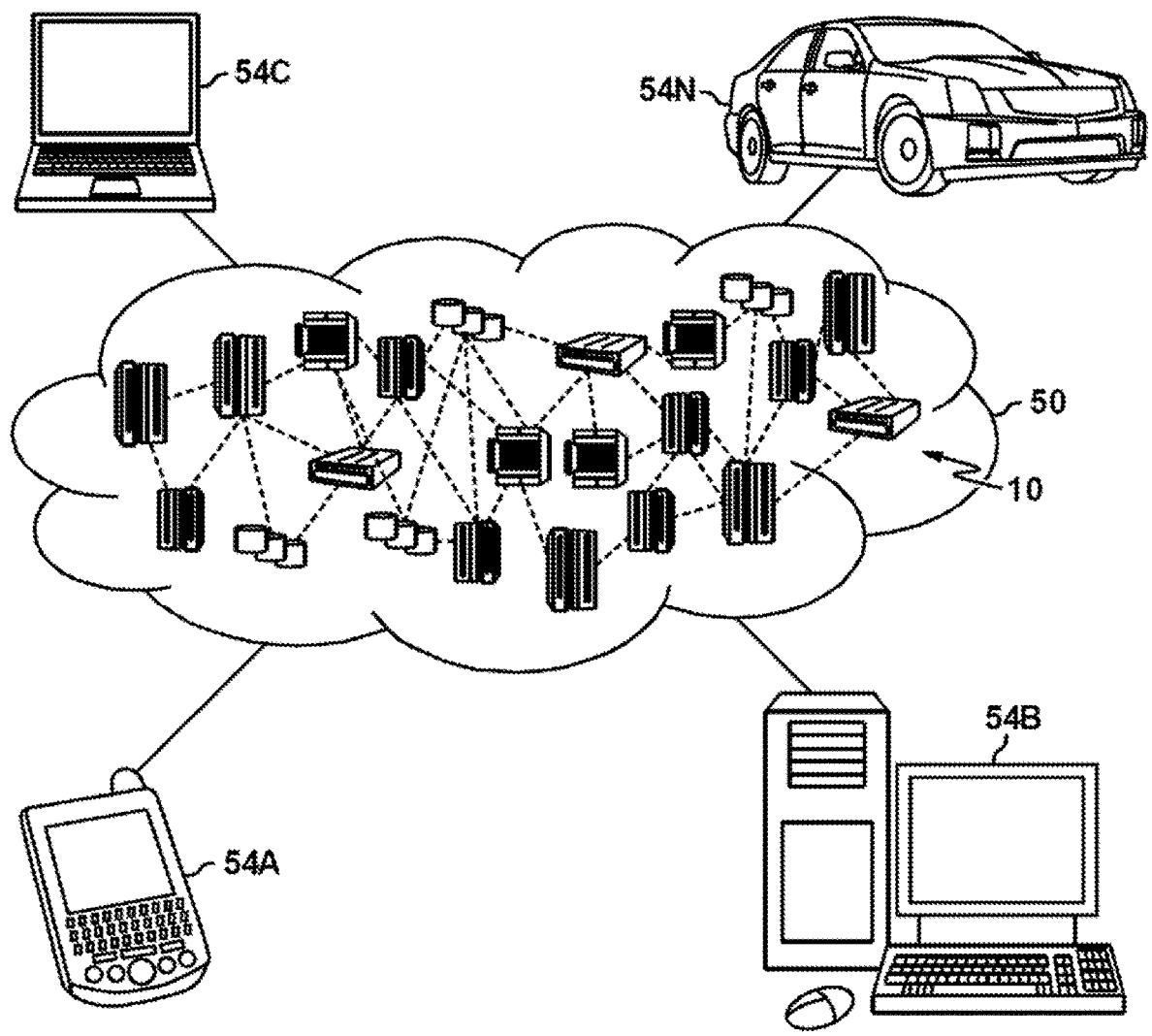
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
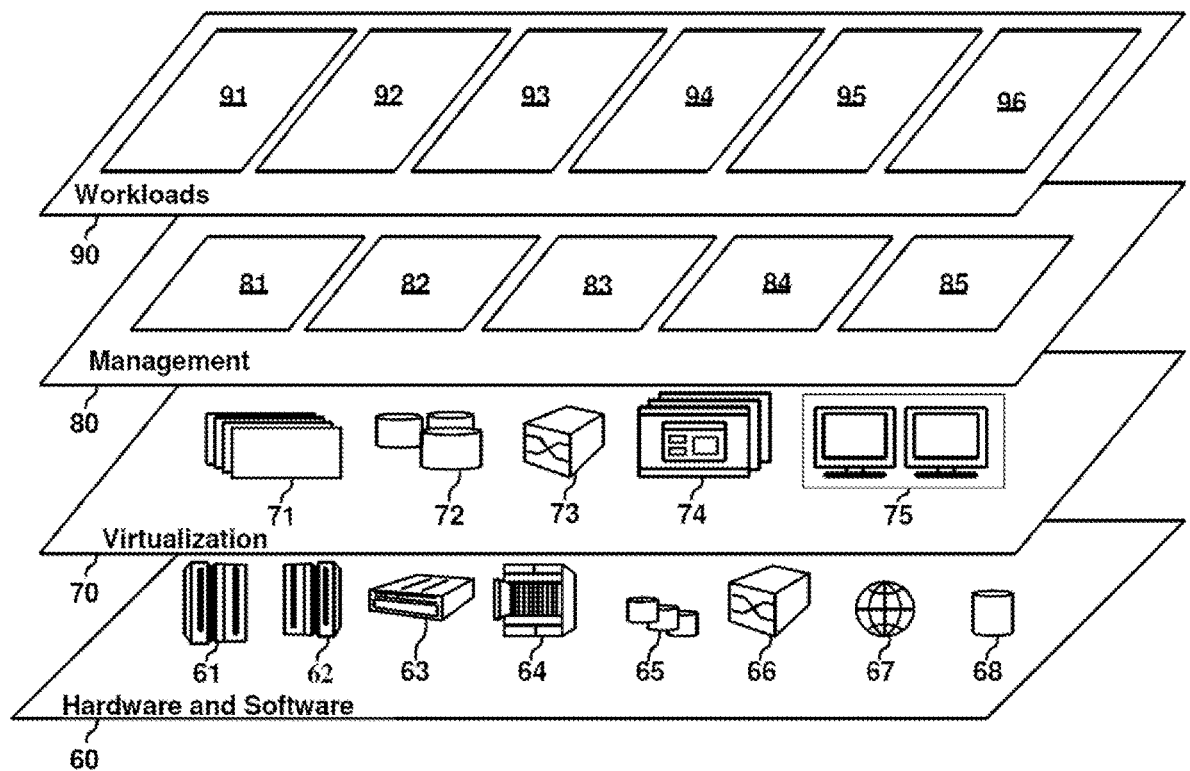
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload management using reinforcement learning 96.

Figure 6:
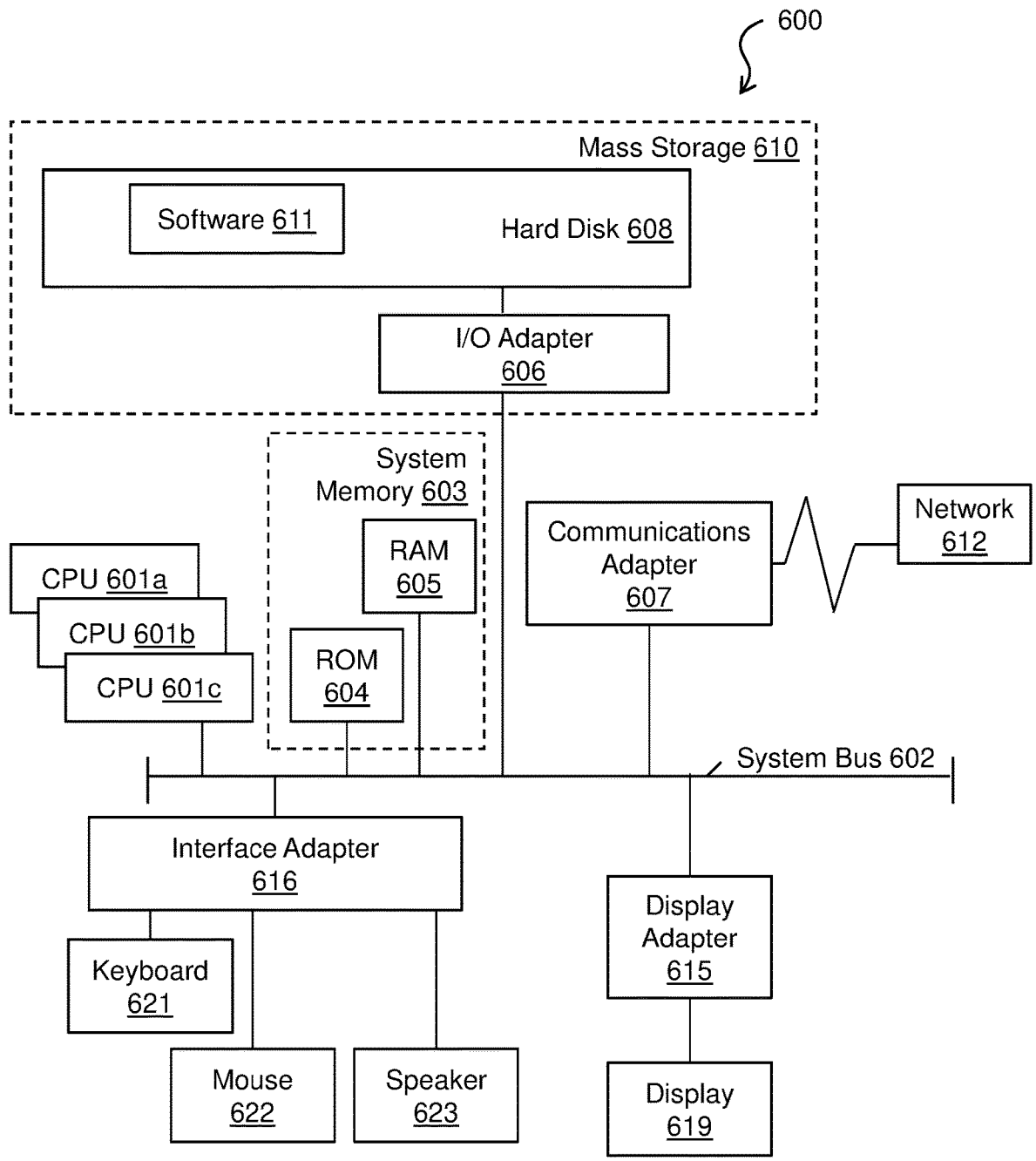
FIG. 6 depicts a block diagram of a computer system for use in implementing one or more embodiments of the present invention.

In one or more embodiments of the present invention, the WLM 102 and any of the hardware/software modules in the system 100 from FIG. 1 can be implemented on the processing system 600 found in FIG. 6. Additionally, the cloud computing environment 50 can be in wired or wireless electronic communication with one or all of the elements of the system 100. Cloud computing environment 50 can supplement, support or replace some or all of the functionality of the elements of the system 100. Additionally, some or all of the functionality of the elements of system 100 can be implemented as a node 10 (shown in FIGS. 4 and 5) of cloud 50. Cloud computing node 10 is only one example of a suitable cloud computing node and is not intended to suggest any limitation as to the scope of use or functionality of embodiments of the invention described herein.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a machine learning model, a predicted workload for a system and a current system state of the system, wherein the machine learning model comprises a reinforcement learning model that is trained utilizing historical system state data that includes a historic state, a taken action, and a gained reward, wherein the predicted workload is determined in part by training the machine learning model on known periodic workloads that are daily or weekly recurrent;
   determining an action to be enacted for the system based at least in part on the predicted workload and the current system state;
   enacting the action for the system;
   evaluating a state of the system after the action has been enacted;
   determining a reward for the machine learning model based on both the state of the system after the action has been enacted and a next predicted workload; and
   updating the machine learning model based on the reward.

2. The computer-implemented method of claim 1, further comprising:
   determining, by the machine learning model, a second predicted workload for the system and a second current system state of the system;
   determining a second action to enact for the system based at least in part on the second predicted workload and the second current system state;
   enacting the second action for the system;
   evaluating a second state of the system after the second action has been enacted;
   determining a second reward for the machine learning model based at least in part on the second state of the system after the second action has been enacted; and
   updating the machine learning model based on the second reward.

3. The computer-implemented method of claim 1, wherein the action comprises an allocation of system resources within the system.

4. The computer-implemented method of claim 1, wherein enacting the action for the system is performed by a workload manager (WLM).

5. The computer-implemented method of claim 1, wherein the reward is further based on a customer goal for the system.

6. The computer-implemented method of claim 5, wherein the customer goal comprises a low-cost workload execution goal.

7. The computer-implemented method of claim 5, wherein the customer goal comprises a high throughput workload execution goal.

8. The computer-implemented method of claim 1, wherein determining the reward is further based on an execution cost on the system for the predicted workload after the action has been enacted.

9. A system comprising:
   a memory having computer readable instructions; and
   one or more processors for executing the computer readable instructions, the computer readable instructions controlling the one or more processors to perform operations comprising:
      determining, by a machine learning model, a predicted workload for a system and a current system state of the system, wherein the machine learning model comprises a reinforcement learning model that is trained utilizing historical system state data that includes a historic state, a taken action, and a gained reward, wherein the predicted workload is determined in part by training the machine learning model on known periodic workloads that are daily or weekly recurrent;
      determining an action to be enacted for the system based at least in part on the predicted workload and the current system state;
      enacting the action for the system;
      evaluating a state of the system after the action has been enacted;
      determining a reward for the machine learning model based at least in part on both the state of the system after the action has been enacted and a next predicted workload; and
      updating the machine learning model based on the reward.

10. The system of claim 9, further comprising:
    determining, by the machine learning model, a second predicted workload for the system and a second current system state of the system;
    determining a second action to enact for the system based at least in part on the second predicted workload and the second current system state;
    enacting the second action for the system;
    evaluating a second state of the system after the second action has been enacted;
    determining a second reward for the machine learning model based at least in part on the second state of the system after the second action has been enacted; and
    updating the machine learning model based on the second reward.

11. The system of claim 9, wherein the action comprises an allocation of system resources within the system.

12. A computer program product comprising a computer readable storage medium having program instructions embodied therewith, the program instructions executable by a processor to cause the processor to perform operations comprising:
    determining, by a machine learning model, a predicted workload for a system and a current system state of the system, wherein the machine learning model comprises a reinforcement learning model that is trained utilizing historical system state data that includes a historic state, a taken action, and a gained reward, wherein the predicted workload is determined in part by training the machine learning model on known periodic workloads that are daily or weekly recurrent;

determining an action to be enacted for the system based at least in part on the predicted workload and the current system state;

enacting the action for the system;

evaluating a state of the system after the action has been enacted;

determining a reward for the machine learning model based on both the state of the system after the action has been enacted and a next predicted workload; and updating the machine learning model based on the reward.

13. The computer program product of claim 12, further comprising:

determining, by the machine learning model, a second predicted workload for the system and a second current system state;

determining a second action to enact for the system based at least in part on the second predicted workload and the second current system state;

enacting the second action for the system;

evaluating a second state of the system after the second action has been enacted;

determining a second reward for the machine learning model based at least in part on the second state of the system after the second action has been enacted; and updating the machine learning model based on the second reward.

14. The computer program product of claim 12, wherein the action comprises an allocation of system resources within the system.

* * * * *